P. SUTHERLAND.
REGULATOR FOR THE FLOW AND LEVEL OF LIQUIDS.
APPLICATION FILED JAN. 25, 1908.
927,899.
Patented July 13, 1909.
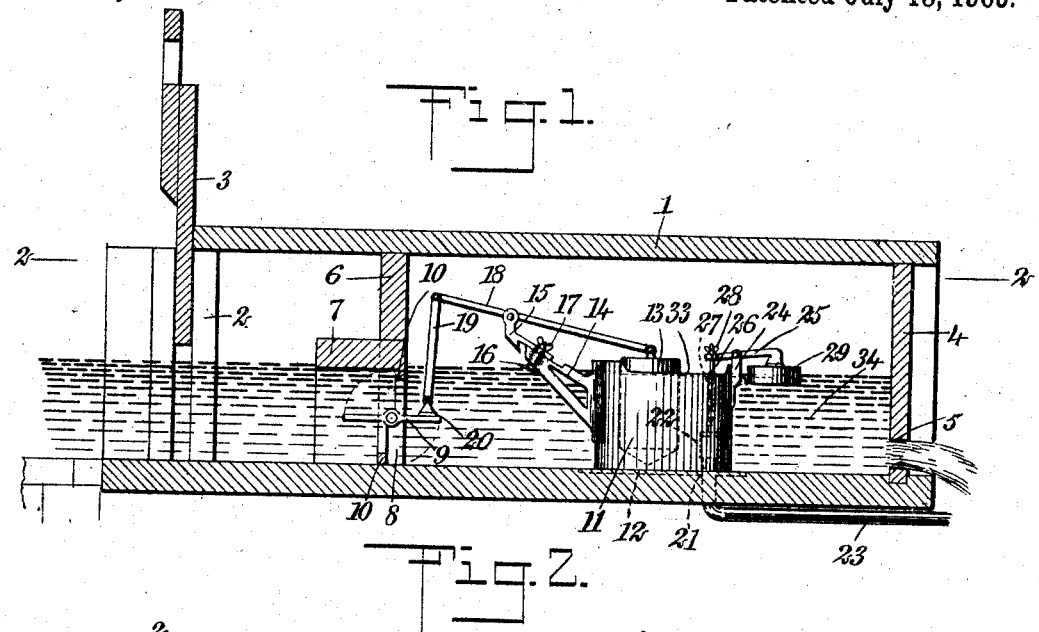
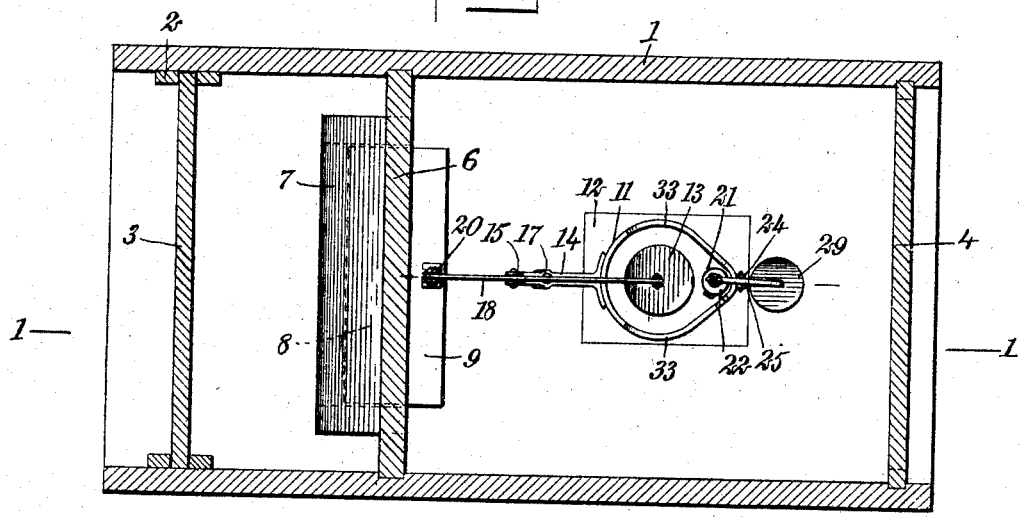
WITNESSES
Ben. Goff
John R. Blackwood
INVENTOR
Paul Sutherland
BY
Munn & Co
ATTORNEYS

UNITED STATES PATENT OFFICE.

PAUL SUTHERLAND, OF LA LUZ, TERRITORY OF NEW MEXICO.

REGULATOR FOR THE FLOW AND LEVEL OF LIQUIDS.

No. 927,899.      Specification of Letters Patent.      Patented July 13, 1909.

Application filed January 25, 1908. Serial No. 412,593.

*To all whom it may concern:*

Be it known that I, PAUL SUTHERLAND, a citizen of the United States, and a resident of La Luz, in the county of Otero and Territory of New Mexico, have invented a new and Improved Regulator for the Flow and Level of Liquids, of which the following is a full, clear, and exact description.

This invention relates to regulators for the flow and level of liquids, and is particularly useful in connection with devices of this character used in irrigation channels, mining ditches and other water supply conduits.

An object of the invention is to provide a simple, inexpensive and efficient regulator of the class described which is absolutely automatic in operation, and which can be adjusted to operate and to control the liquid body at different levels and at different rates of flow.

A further object of the invention is to provide a regulator which has an inlet so controlled by the level of the liquid, that the inlet is closed when the level exceeds a predetermined height, and in which the inlet is opened when the level falls below a predetermined height.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a longitudinal section of the regulator on the line 1—1 of Fig. 2; Fig. 2 is a longitudinal section on the line 2—2 of Fig. 1; and Fig. 3 is an enlarged longitudinal section of certain details of the inlet controlling mechanism.

Before proceeding to a more detailed explanation of my invention, it should be understood that while the device is particularly useful in connection with water supply service, for example, in irrigation channels, mining ditches and the like, it can also be advantageously employed for other purposes, such as water supply to stationary steam boilers, and in connection with the flood-gates of sewers and weirs.

The regulator is absolutely automatic in its operation and requires no attention of any kind. The inlet controlling mechanism can be adjusted to adapt the device for different liquid levels and for different rates of flow. By suitably adjusting the parts, a constant, uniformly regulated flow can be maintained through the regulator, provided of course, that the supply is sufficient for the purpose.

In the accompanying drawings, I provide a casing in which the regulating mechanism is arranged, and which is provided with an inlet and a discharge. This casing does not constitute an essential part of my invention, and if so desired may be replaced by an open ditch, a conduit, or any other form of channel or casing adapted to the purpose, or may be inclosed within a boiler or other similar reservoir. I have also shown an intake gate, by means of which the flow through the channel can be cut off. This also forms no part of the invention, and is merely shown for convenience and as it is customary to employ such a gate.

The discharge of the device, shown as an opening in the discharge wall, may be of any convenient type, for example, it may consist of a nozzle, a flue, or the like. The discharge may be by evaporation, as in a boiler.

I employ floats operable by the liquid level and serving to control the inlet valve. The floats, and the valves which they control, may be of any type which can be advantageously or preferably employed, and similarly, the means for operatively connecting the floats and the valves, may be varied to suit individual preference or special conditions.

I wish to emphasize the fact that many of the details of construction form no part of the invention and that the underlying principle of the same consists in the provision of means operable by the water level, for closing the inlet valve, and further means similarly operable, for opening the inlet valve, so that when a predetermined level which controls the rate of discharge and flow is departed from, the valve of the inlet is correspondingly adjusted.

Referring more particularly to the drawings, 1 represents a casing which may be of any suitable form and may be fashioned from any suitable material. At one end, the casing has guides 2 at opposite sides, in which is arranged an in-take gate 3. At the opposite end, the casing has a transverse discharge wall 4 provided with a discharge opening 5. Near the in-take gate, the casing has a partition 6 provided with a conduit 7 forming the inlet opening 8. Across the latter is mounted a pivoted butterfly valve 9 adapted to abut against cross-bars 10, completely to close the inlet opening.

Between the partition 6 and the wall 4 within the casing, is arranged a reservoir 11, fashioned from any convenient material such as sheet iron or the like, and substantially cylindrical in form. The reservoir 11 has a base 12, by means of which it can be securely positioned. At the side remote from the partition 6, the reservoir is laterally extended for a purpose which will appear hereinafter. A float 13 is movably located in the reservoir, and is preferably of cylindrical form with a conical bottom. I have found that a float of this shape can be advantageously employed and is adapted to receive ballast to adjust the float. The reservoir has at the outside, an arm 14 upon which is adjustably mounted a bracket 15, secured in position by means of a bolt 16 and a thumb-nut 17. A lever 18 is pivoted upon the bracket, and at one end is secured to the float 13 and at the other end carries a link 19, movably secured by means of a bracket 20, to the inlet valve 9. The reservoir, at the bottom, has an outlet 21 arranged within the extended portion of the reservoir so that it shall not interfere with the free movement of the float 13. The outlet has the end threaded and adjustably mounted thereon is a correspondingly threaded head 30 with a hinged valve or closure 22. The outlet by means of a pipe 23 discharges at a point preferably adjacent to the discharge 5. Thus the outlet is arranged above the bottom of the reservoir and by means of the head 30 can be adjusted. The reservoir has a support 24 provided with a pivoted lever 25. The latter is adjustably connected by means of a bolt 26 and a chain or other flexible member 27, with the hinged lid or closure 22. The latter has an eye for attaching it to the chain. The bolt 26 carries a thumb-nut 28, by means of which it can be adjusted with respect to the lever 25. At the end of the lever 25 remote from the bolt 26 is a float 29, controlled by the liquid level outside of the reservoir. At the upper edge, the reservoir has cut-away portions or recesses 33, so that when the level of the liquid 34, within the casing reaches a certain height it will overflow into the reservoir and fill the latter. If so desired, instead of the edge recesses the reservoir can be provided with suitable openings in its wall for a like purpose. I prefer to provide overflow openings which can be adjusted to permit the liquid to overflow into the reservoir at a plurality of predetermined levels.

The rate and amount of liquid flow through the discharge opening 5, of course depend upon the height or head of liquid within the channel or casing. The reservoir 11 must be so positioned in the channel or casing that the lower edges of the overflow openings 33 are level and exactly at the predetermined height of the level for the desired flow through the discharge opening 5. If the reservoir is provided with adjustable openings or with a plurality of openings which can be closed, it is adapted for use at different rates and amounts of flow. The height of the liquid in the casing at which an overflow into the reservoir occurs, depends upon the position of the overflow opening. If the liquid in the main ditch or channel rises to a point above the predetermined level in the casing 1, there is of course, greater resistance to the operation of the valve 9, owing to the greater liquid pressure, and it may be necessary to increase the weight of the float 13 by the introduction into the same of ballast or by adjusting the connecting parts at the movable bracket by means of the bolt 16 and the thumb-nut 17, to shorten the bracket so that when the reservoir 11 is full, the valve 9 will be tightly closed. As soon as the level in the casing 1 exceeds the predetermined level, an overflow occurs into the reservoir 11 and causes the float 13 to rise and thereby to close the valve 9 until the overflow ceases. The float 13 and the valve 9 will thus remain stationary as long as the head in the main ditch does not increase. The valve 22 is adjusted so that it does not discharge the liquid from the reservoir 11 below a point at which the float 13 holds the valve 9 wide open, and the connection between the float 29 and the valve 22 is adjusted by means of the thumb-nut 28 so that the valve 22 will just close when the liquid level in the box 1 is at the predetermined height; that is, level with the lower edge of the overflow recesses 33. Should the head in the main ditch now fall, the flow of liquid past the valve 9 will decrease, and the level in the casing 1 therefore, also will decrease, carrying with it the float 29. The latter opens the valve 22 and permits liquid to escape from the reservoir 11 through the outlet 21, until the float 13 has fallen to such a point that the valve 9 is opened sufficiently to admit the required quantity of liquid from the main ditch to raise the level in the casing 1, and with it the float 29, until the predetermined level is reached, whereupon the float 13 and the valve 9 will be again brought to rest. There will then occur a slight overflow into the reservoir 11, which will be sufficient to raise the float 13 and close the valve 9 far enough to prevent admission of more than enough liquid from the main ditch necessary to maintain the predetermined level.

It will be seen that as long as the supply and head in the main ditch stay constant, the mechanism remains stationary. Any variation in the supply however, causes a corresponding change in the level of the liquid in the casing 1 and thereby the mechanism is set in operation to counteract the change, and such operation does not cease at a readjustment merely, of equilibrium between the supply and the discharge but continues until the predetermined level is restored in the casing.

By elevating the valve 22 above the bottom of the reservoir, a certain quantity of liquid always remains in the latter whether the valve 22 is open or not. Thus, when an overflow into the reservoir occurs, the action is more rapid owing to the fact that it is not necessary to fill the reservoir up to the level of the valve 22, and thus a slight increase in the liquid contents of the reservoir causes a corresponding movement of the float 13.

Having thus described my invention, I claim as new, and desire to secure by Letters Patent:

1. A regulator of the character described, comprising a channel having an inlet and a discharge, a valve for controlling the inlet, a reservoir in the channel and having unobstructed means at its upper end whereby the liquid is free to flow into the reservoir whenever it exceeds a predetermined level in the channel, said reservoir having a valve controlled outlet, a float in the reservoir, a connection between the float and the inlet valve of the channel, a float adapted to be operated by the liquid of the channel, and a connection between the float and the outlet valve of the reservoir.

2. A regulator of the character described, comprising a channel having an inlet and a discharge, a valve for controlling the inlet, a reservoir intermediate of the inlet and discharge, said reservoir having means at its upper end whereby the liquid can flow into it when the liquid exceeds a predetermined level, and provided in its bottom with an adjustable valved outlet, a float in the reservoir, a connection between the float and the inlet valve, a float adapted to be operated by the liquid of the channel, and a connection between the float and the valve of the outlet of the reservoir.

3. A regulator of the character described, comprising a channel having an inlet and a discharge, a hinged valve for controlling the inlet, a reservoir in the channel, and having means at its upper end whereby the liquid can flow from the channel into the reservoir when it exceeds a predetermined level, said reservoir being provided with an adjustable outlet pipe projecting into the reservoir and leading out through the bottom thereof, a hinged valve for the said outlet pipe, a float in the reservoir, a connection between the float and the inlet valve of the channel, a float adapted to be operated by the liquid of the channel, and a connection between the float and the valve of the outlet pipe of the reservoir.

4. A regulator, comprising a channel having an inlet and a discharge, a valve movably arranged at said inlet, a reservoir intermediate said inlet and said discharge and arranged to receive liquid from said channel when the liquid in said channel exceeds a predetermined level, a float within said reservoir, means for operatively connecting said float and said valve, means for adjusting said connecting means, whereby the operation of said valve by said float can be regulated, said reservoir having a discharge, a float at the outside of said reservoir, and means for operatively connecting said float outside of said reservoir and said discharge of said reservoir, whereby said reservoir is emptied when the liquid in said channel falls below a predetermined level.

5. A regulator, comprising a channel having an inlet and a discharge, a valve adjustably arranged at said inlet, a reservoir intermediate said inlet and said discharge and arranged to receive liquid when the liquid in said channel exceeds a predetermined level, a float in said reservoir, said reservoir having an arm, a bracket adjustably mounted upon said arm, a lever pivoted upon said bracket and secured at one end to said float and having at the other end a link, said link being secured to said valve, said reservoir having a discharge, a movable closure at said discharge, a lever pivoted upon said reservoir, a member adjustably secured to said lever and said closure, and a float outside of said reservoir and controlling said lever mounted upon said reservoir.

6. In a regulator of the character described, a channel having a valved controlled inlet, a reservoir in the channel and having brackets at opposite sides, and provided in its bottom with an outlet pipe and having its end extensible and projecting into the reservoir, a valve for the outlet pipe, a float in the reservoir, a lever fulcrumed on one of the brackets and having one end secured to the float, a connection between the other end of the lever and the inlet valve of the channel, a lever mounted on the other bracket of the reservoir, a float on the outer end of the lever, and a connection between the inner end of the lever and the valve of the outlet of the reservoir.

In testimony whereof I have signed my name to this specification in the presence of two subscribing witnesses.

PAUL SUTHERLAND.

Witnesses:
  J. D. SANFORD,
  D. M. SUTHERLAND.